US012624261B2

(12) United States Patent
Tsuchibuchi et al.

(10) Patent No.: US 12,624,261 B2
(45) Date of Patent: May 12, 2026

(54) ADHESIVE FOR HIGH-FREQUENCY DIELECTRIC HEATING, STRUCTURE, AND MANUFACTURING METHOD OF STRUCTURE

(71) Applicant: LINTEC CORPORATION, Tokyo (JP)

(72) Inventors: Koji Tsuchibuchi, Tokyo (JP); Naoki Taya, Tokyo (JP)

(73) Assignee: LINTEC Corporation, Tokyo (JP)

( * ) Notice: Subject to any disclaimer, the term of this patent is extended or adjusted under 35 U.S.C. 154(b) by 691 days.

(21) Appl. No.: 17/914,251

(22) PCT Filed: Mar. 31, 2021

(86) PCT No.: PCT/JP2021/014034
§ 371 (c)(1),
(2) Date: Sep. 23, 2022

(87) PCT Pub. No.: WO2021/201173
PCT Pub. Date: Oct. 7, 2021

(65) Prior Publication Data
US 2023/0111471 A1 Apr. 13, 2023

(30) Foreign Application Priority Data

Mar. 31, 2020 (JP) ................................. 2020-063291
Mar. 31, 2020 (JP) ................................. 2020-063433
Dec. 4, 2020 (JP) ................................. 2020-202036

(51) Int. Cl.
| | |
|---|---|
| *C09J 153/02* | (2006.01) |
| *C08K 3/22* | (2006.01) |
| *C09J 5/06* | (2006.01) |
| *C09J 11/04* | (2006.01) |

(52) U.S. Cl.
CPC .............. *C09J 153/02* (2013.01); *C08K 3/22* (2013.01); *C09J 5/06* (2013.01); *C09J 11/04* (2013.01); *C08K 2003/2296* (2013.01)

(58) Field of Classification Search
CPC ........... C09J 153/02; C09J 5/06; C09J 11/04; C09J 9/00; C09J 2301/408; C09J 2453/00; C09J 7/10; C09J 153/025; C08K 3/22; C08K 2003/2296; C08K 2003/2241; C08K 3/24; C08K 3/34; B29C 65/04; B29C 65/4815; B29C 65/5021; B29C 65/5057; B29C 65/8215; B29C 66/1122; B29C 66/41; B29C 66/45; B29C 66/472; B29C 66/71; B29C 66/919; B29C 66/929; B29C 66/949; B32B 27/08; B32B 27/20; B32B 2250/246; B32B 2264/1022; B32B 2264/104; B32B 2270/00; B32B 2307/732; B32B 7/05; B32B 2264/1024; B32B 2307/204; B32B 2307/54; B32B 2405/00; B32B 7/12; B32B 27/302; H05B 6/62; C08L 53/025
See application file for complete search history.

(56) References Cited

U.S. PATENT DOCUMENTS

| | | | | |
|---|---|---|---|---|
| 7,807,241 B2 * | 10/2010 | Sasagawa | ............... | B32B 25/04 |
| | | | | 428/36.1 |
| 2010/0012884 A1 * | 1/2010 | Nakamichi | .............. | C08K 3/22 |
| | | | | 252/70 |
| 2018/0242448 A1 | 8/2018 | Yoshikawa et al. | | |
| 2019/0283334 A1 * | 9/2019 | Ishikawa | .................... | C09J 7/00 |
| 2019/0352546 A1 * | 11/2019 | Taya | ........................... | C08J 7/18 |
| 2020/0058577 A1 | 2/2020 | Yoshida et al. | | |

FOREIGN PATENT DOCUMENTS

| | | | |
|---|---|---|---|
| CN | 108368323 A | 8/2018 |
| CN | 109890923 A | 6/2019 |
| JP | H05-340058 A | 12/1993 |
| JP | 2004-148839 A | 5/2004 |
| JP | 2009-185138 A | 8/2009 |
| JP | 2010-006908 A | 1/2010 |
| JP | 2015-183034 A | 10/2015 |
| JP | 2017-145425 A | 8/2017 |
| JP | 2018-053077 A | 4/2018 |
| JP | 2018-145295 A | 9/2018 |
| JP | 2018-527448 A | 9/2018 |
| WO | 2018/079356 A1 | 5/2018 |
| WO | 2019/151014 A1 | 8/2019 |

OTHER PUBLICATIONS

International Search Report issued in corresponding International Patent Application No. PCT/JP2021/0143034, dated Jun. 22, 2021, with English translation.
English translation of the International Preliminary Report on Patentability issued in corresponding International Patent Application No. PCT/JP2021/014034, dated Sep. 29, 2022.
Extended European Search Report issued in the corresponding European patent Application No. 21780590.2 dated Apr. 15, 2024.
Office Action issued for the corresponding Chinese patent application No. 202180025956.5 on Jan. 20, 2024, w/ English Translation.

* cited by examiner

*Primary Examiner* — Robert S Jones, Jr.
*Assistant Examiner* — Joshua Caleb Bledsoe
(74) *Attorney, Agent, or Firm* — Rimon P.C.

(57) ABSTRACT

A high-frequency dielectric heating adhesive contains a thermoplastic resin, in which the thermoplastic resin contains a styrene copolymer resin, an amount of the styrene copolymer resin contained in the thermoplastic resin is 40% or more by volume and 100% or less by volume, the styrene copolymer resin has a styrene monomer unit content of 10% or more by mass and 90% or less by mass, the high-frequency dielectric heating adhesive has a tensile modulus of 20 MPa or more, and the high-frequency dielectric heating adhesive has a dielectric property (tan $\delta$/$\varepsilon$'r) of 0.005 or more, where tan $\delta$ is a dielectric loss tangent at 23 degrees C. and a frequency of 40.68 MHz, and $\varepsilon$'r is a relative dielectric constant at 23 degrees C. and a frequency of 40.68 MHz.

14 Claims, 4 Drawing Sheets

ADHESIVE FOR HIGH-FREQUENCY DIELECTRIC HEATING, STRUCTURE, AND MANUFACTURING METHOD OF STRUCTURE

CROSS REFERENCE TO RELATED APPLICATIONS

This patent application is the U.S. National Phase under 35 U.S.C. § 371 of International Application No. PCT/JP2021/014034, filed on Mar. 31, 2021, which claims the benefit of Japanese Patent Application No. 2020-063291, dated Mar. 31, 2020, Japanese Patent Application No. 2020-063433, dated Mar. 31, 2020, and Japanese Patent Application No. 2020-202036, dated Dec. 4, 2020, the entire contents of each are hereby incorporated by reference in their entirety.

TECHNICAL FIELD

The present invention relates to a high-frequency dielectric heating adhesive, a structure, and a method for producing a structure.

BACKGROUND ART

As a method for producing a laminate by bonding multiple adherends to each other, for example, a method has been reported in which an adhesive is interposed between adherends and then subjected to, for example, dielectric heating treatment, induction heating treatment, ultrasonic welding treatment, or laser welding treatment.

For example, Patent Literature 1 discloses that a surface sheet including a film layer containing silica and a resin blend of a polyolefin resin and a styrene copolymer resin is subjected to thermal fusion bonding. This film layer described in Patent Literature 1 contains the resin blend containing 50 parts by mass of the styrene copolymer resin and 5 parts by mass of silica with respect to 100 parts by mass of the polyolefin resin.

CITATION LIST

Patent Literature

Patent Literature 1: JP 2004-148839 A

SUMMARY OF THE INVENTION

Problems to be Solved by the Invention

In the surface sheet disclosed in Patent Literature 1, the resin blend contained in the film layer has a low styrene copolymer resin content. Thus, for example, when the surface sheet disclosed in Patent Literature 1 is bonded to an adherend containing a styrene resin, it is difficult to bond the surface sheet and the adherend in a short time, and the adhesiveness of the surface sheet to the adherend is not sufficient.

Further, conventional adhesives containing styrene resins have room for further improvement in strength characteristics, such as fracture toughness.

An object of the invention is to provide a high-frequency dielectric heating adhesive containing a styrene resin, the high-frequency dielectric heating adhesive being capable of bonding in a short time and having improved fracture toughness, a structure including an adherend bonded using the high-frequency dielectric heating adhesive, and a method for producing the structure.

Problems to be Solved by the Invention

An aspect of the invention provides a high-frequency dielectric heating adhesive containing a thermoplastic resin (A), in which the thermoplastic resin (A) contains a styrene copolymer resin (a1), an amount of the styrene copolymer resin (a1) contained in the thermoplastic resin (A) is 40% or more by volume and 100% or less by volume, the styrene copolymer resin (a1) has a styrene monomer unit content of 10% or more by mass and 90% or less by mass, the high-frequency dielectric heating adhesive has a tensile modulus of 20 MPa or more, and the high-frequency dielectric heating adhesive has a dielectric property (tan $\delta/\varepsilon$'r) of 0.005 or more, where tan $\delta$ is a dielectric loss tangent at 23 degrees C. and a frequency of 40.68 MHz, and $\varepsilon$'r is a relative dielectric constant at 23 degrees C. and a frequency of 40.68 MHz.

The high-frequency dielectric heating adhesive according to the aspect of the invention preferably further contains a dielectric filler (B) that generates heat when a high-frequency electric field is applied.

In the high-frequency dielectric heating adhesive according to the aspect of the invention, the dielectric filler (B) is preferably at least one selected from the group consisting of zinc oxide, silicon carbide, titanium oxide, and barium titanate.

In the high-frequency dielectric heating adhesive according to the aspect of the invention, the high-frequency dielectric heating adhesive preferably has a flow start temperature of 80 degrees C. or higher and 250 degrees C. or lower.

In the high-frequency dielectric heating adhesive according to the aspect of the invention, the styrene copolymer resin (a1) is preferably a styrene elastomer.

In the high-frequency dielectric heating adhesive according to the aspect of the invention, the styrene copolymer resin (a1) is preferably a hydrogenated resin.

In the high-frequency dielectric heating adhesive according to the aspect of the invention, preferably, the thermoplastic resin (A) further contains a thermoplastic resin (a2) different from the styrene copolymer resin (a1).

In the high-frequency dielectric heating adhesive according to the aspect of the invention, an amount of the styrene copolymer resin (a1) contained is preferably 20% or more by volume and 98% or less by volume with respect to an entirety of the high-frequency dielectric heating adhesive.

In the high-frequency dielectric heating adhesive according to an aspect of the invention, the high-frequency dielectric heating adhesive is preferably used by applying a high-frequency electric field of 3 MHz or more and 300 MHz or less.

In the high-frequency dielectric heating adhesive according to the aspect of the invention, preferably, the high-frequency dielectric heating adhesive is an adhesive for bonding one or more adherends, and at least one of the one or more adherends contains a resin having an aromatic ring.

In the high-frequency dielectric heating adhesive according to the aspect of the invention, the resin having an aromatic ring is preferably a styrene resin.

In the high-frequency dielectric heating adhesive according to the aspect of the invention, the high-frequency dielectric heating adhesive is preferably an adhesive sheet.

In the high-frequency dielectric heating adhesive according to the aspect of the invention, the adhesive sheet preferably has a thickness of 5 μm or more and 2,000 μm or less.

Another aspect of the invention provides a structure including one or more adherends bonded using the high-frequency dielectric heating adhesive according to the aspect of the invention.

Still another aspect of the invention provides a method for producing a structure including: disposing the high-frequency dielectric heating adhesive according to the aspect of the invention on one or more adherends; and applying a high-frequency electric field of 3 MHz or more and 300 MHz or less to the high-frequency dielectric heating adhesive to bond the adherends.

According to the aspects of the invention, it is possible to provide the high-frequency dielectric heating adhesive containing a styrene resin, the high-frequency dielectric heating adhesive being capable of bonding in a short time and having improved fracture toughness, the structure including an adherend bonded using the high-frequency dielectric heating adhesive, and a method for producing the structure.

DESCRIPTION OF EMBODIMENTS

High-Frequency Dielectric Heating Adhesive

Figure 1A:
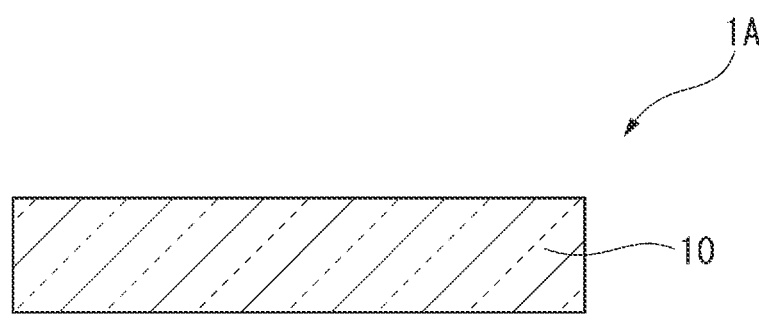
FIG. 1A is a schematic cross-sectional view of an exemplary high-frequency dielectric heating adhesive according to an exemplary embodiment of the invention.

A high-frequency dielectric heating adhesive according to the exemplary embodiment contains a thermoplastic resin (A). The thermoplastic resin (A) contains a styrene copolymer resin (a1). The thermoplastic resin (A) has a styrene copolymer resin (a1) content of 40% or more by volume and 100% or less by volume. The styrene copolymer resin (a1) has a styrene monomer unit content of 10% or more by mass and 90% or less by mass. The high-frequency dielectric heating adhesive according to the exemplary embodiment has a tensile modulus of 20 MPa or more. The high-frequency dielectric heating adhesive according to the exemplary embodiment has a dielectric property (tan δ/ε'r) of 0.005 or more, where tan δ is a dielectric loss tangent at 23 degrees C. and a frequency of 40.68 MHz, and ε'r is a relative dielectric constant at 23 degrees C. and a frequency of 40.68 MHz.

Thermoplastic Resin (A)

The thermoplastic resin (A) contains the styrene copolymer resin (a1). The thermoplastic resin (A) may contain a thermoplastic resin (a2) different from the styrene copolymer resin (a1), or may not contain the thermoplastic resin (a2). The thermoplastic resin (a2) will be described later.

Styrene Copolymer Resin (a1)

In the high-frequency dielectric heating adhesive according to the exemplary embodiment, the styrene copolymer resin (a1) content with respect to the entire thermoplastic resin (A) is 40% or more by volume and 100% or less by volume in volume base.

For example, when the high-frequency dielectric heating adhesive, in which the styrene copolymer resin (a1) content with respect to the entire thermoplastic resin (A) is 40% or more by volume, is bonded to an adherend containing a resin having an aromatic ring, the adhesiveness between the adherend and the high-frequency dielectric heating adhesive according to the exemplary embodiment is easily improved.

The styrene copolymer resin (a1) content of the thermoplastic resin (A) is preferably 45% or more by volume, more preferably 50% or more by volume, still more preferably 55% or more by volume, still further more preferably 60% or more by volume, in volume base.

The upper limit of the styrene copolymer resin (a1) content of the thermoplastic resin (A) may be, but is not particularly limited to, for example, less than 100% by volume, 95% or less by volume, 92% or less by volume, or 90% or less by volume, in volume base.

For example, when the adhesive, in which the styrene copolymer resin (a1) content of the thermoplastic resin (A) is 45% or more by volume, is bonded to an adherend containing a resin having an aromatic ring, higher adhesiveness to the adherend is easily obtained.

The styrene copolymer resin (a1) content with respect to the entire high-frequency dielectric heating adhesive is preferably 20% or more by volume, more preferably 30% or more by volume, still more preferably 40% or more by volume, still further more preferably 50% or more by volume, in volume base.

The styrene copolymer resin (a1) content with respect to the entire high-frequency dielectric heating adhesive is preferably 98% or less by volume, more preferably 95% or less by volume, in volume base.

For example, when the adhesive, in which the styrene copolymer resin (a1) content with respect to the entire high-frequency dielectric heating adhesive is 20% or more by volume, is bonded to an adherend containing a resin having an aromatic ring, higher adhesiveness to the adherend is easily obtained.

A styrene copolymer resin (a1) content of 98% or less by volume with respect to the entire high-frequency dielectric heating adhesive can easily result in improved dielectric property of the high-frequency dielectric heating adhesive and improved adhesion force to an adherend.

In the high-frequency dielectric heating adhesive according to the exemplary embodiment, the styrene monomer unit content of the styrene copolymer resin (a1) is 10% or more by mass and 90% or less by mass, in mass base.

A styrene monomer unit content of the styrene copolymer resin (a1) of 10% or more by mass easily results in, for example, improved adhesiveness of the high-frequency dielectric heating adhesive to an adherend containing a resin having an aromatic ring and improved heat resistance of the adhesive in an assumed actual use environment.

A styrene monomer unit content of the styrene copolymer resin (a1) of 90% or less by mass easily results in improved fracture toughness of the high-frequency dielectric heating adhesive. Thus, for example, when an impact is applied to a structure including an adherend bonded using the high-frequency dielectric heating adhesive according to the exemplary embodiment, the structure is not easily damaged.

The styrene monomer unit content of the styrene copolymer resin (a1) is preferably, in mass base, 15% or more by mass, more preferably 20% or more by mass, still more preferably 25% or more by mass, still further more preferably 30% or more by mass, yet still further more preferably 40% or more by mass, even still further more preferably 50% or more by mass.

The styrene monomer unit content of the styrene copolymer resin (a1) is preferably, in mass base, 80% or less by mass, more preferably 70% or less by mass.

For example, when the adhesive, in which the styrene monomer unit content of the styrene copolymer resin (a1) is 15% or more by mass, is bonded to an adherend containing a resin having an aromatic ring, higher adhesiveness to the adherend is easily obtained.

A styrene monomer unit content of the styrene copolymer resin (a1) of 80% or less by mass easily results in higher fracture toughness of the high-frequency dielectric heating adhesive.

Herein, the styrene copolymer resin represents a resin obtained by copolymerizing a styrene monomer with another monomer. That is, the styrene copolymer resin contains a styrene monomer unit and another monomer unit different from the styrene monomer unit. The styrene monomer represents a monomer having a styrene skeleton.

Herein, the styrene resin is a resin having a styrene skeleton and represents at least one of a styrene homopolymer resin (a homopolymer containing a styrene monomer unit) or a styrene copolymer resin (a copolymer containing a styrene monomer unit).

The styrene copolymer resin (a1) is exemplified by a resin obtained by copolymerizing a styrene monomer, such as α-methylstyrene or β-methylstyrene, and an aliphatic monomer (a monomer having an aliphatic compound skeleton). The styrene copolymer resin may be a hydrogenated styrene resin (hydrogenated resin) obtained by hydrogenating a copolymer resin of a styrene monomer and an aliphatic monomer.

The styrene copolymer resin (a1) is preferably a styrene elastomer.

Herein, the styrene copolymer resin (a1) includes a styrene elastomer.

When the styrene copolymer resin (a1) is a styrene elastomer, the fracture toughness of the high-frequency dielectric heating adhesive is more easily improved. Examples of the styrene elastomer include styrene-conjugated diene copolymers and styrene-olefin copolymers. Specific examples of the styrene-conjugated diene copolymers include unhydrogenated styrene-conjugated diene copolymers, such as styrene-butadiene copolymers, styrene-butadiene-styrene copolymers (SBS), styrene-butadiene/butylene-styrene copolymers, styrene-isoprene copolymers, styrene-isoprene-styrene copolymers (SIS), and styrene-ethylene/isoprene-styrene copolymers; and hydrogenated styrene-conjugated diene copolymers, such as styrene-ethylene/propylene-styrene copolymers (SEPS) and styrene-ethylene/butylene-styrene copolymers (SEBS). The styrene elastomer may be a hydrogenated product (hydrogenated resin) or an unhydrogenated product.

The styrene copolymer resin (a1) is preferably a hydrogenated resin, more preferably a hydrogenated resin of a styrene elastomer. When the styrene copolymer resin (a1) is a hydrogenated resin, reduction due to ozone degradation is not likely to occur, easily improving weather resistance of the high-frequency dielectric heating adhesive. The improvement in weather resistance inhibits, for example, a decrease in fracture toughness over time.

One styrene copolymer resin (a1) may be used alone, or two or more styrene copolymer resins (a1) may be used in combination. For example, the styrene copolymer resin (a1) may be at least one selected from the group consisting of styrene-butadiene-styrene copolymers (SBS), styrene-isoprene-styrene copolymers (SIS), and styrene-ethylene/butylene-styrene copolymers (SEBS). Among these, the styrene copolymer resin (a1) preferably contains a styrene-ethylene/butylene-styrene copolymer (SEBS).

Thermoplastic Resin (a2)

The thermoplastic resin (a2) is a component that may be contained in the thermoplastic resin (A), as needed. The thermoplastic resin (a2) content of the thermoplastic resin (A) is, in volume base, 0% or more by volume and 60% or less by volume.

When the thermoplastic resin (A) contains the thermoplastic resin (a2), the thermoplastic resin (a2) content of the thermoplastic resin (A) is preferably, in volume base, more than 0% by volume, more preferably 5% or more by volume, still more preferably 8% or more by volume, still further more preferably 10% or more by volume.

When the thermoplastic resin (A) contains the thermoplastic resin (a2), the thermoplastic resin (a2) content of the thermoplastic resin (A) is preferably, in volume base, 55% or less by volume, more preferably 50% or less by volume, still more preferably 45% or less by volume, still further more preferably 40% or less by volume.

A thermoplastic resin (a2) content of more than 0% by volume easily provides heat resistance to the high-frequency dielectric heating adhesive.

A thermoplastic resin (a2) content of 55% or less by volume results in a higher styrene copolymer resin (a1) content of the thermoplastic resin (A). Thus, for example, when the adhesive is bonded to an adherend containing a resin having an aromatic ring, higher adhesiveness to the adherend is easily obtained.

The thermoplastic resin (a2) is not limited to a particular type of resin. One thermoplastic resin (a2) may be used alone, or two or more thermoplastic resins (a2) may be used in combination, as long as these resins are different from the styrene copolymer resin (a1).

As described above, the thermoplastic resin (a2) is a resin different from the styrene copolymer resin (a1). Thus, in the exemplary embodiment, the styrene resin as the thermoplastic resin (a2) does not contain the styrene copolymer resin (a1). Hereinafter, in the description of the thermoplastic resin (a2), the styrene resin as the thermoplastic resin (a2) may be referred to as a styrene resin (a3) for convenience.

In view of, for example, being easy to melt and having heat resistance, the thermoplastic resin (a2) is preferably at least one selected from the group consisting of polyolefin resins, polar moiety-containing polyolefin resins, styrene resin (a3), polyacetal resins, polycarbonate resins, polyacrylic resins, polyamide resins, polyimide resins, polyvinyl acetate resins, phenoxy resins, polyester resins, polyphenylene sulfide resins, and polyphenylene ether resins.

Among the resins exemplified above, the thermoplastic resin (a2) is more preferably a polyolefin resin or a polyphenylene ether resin, still more preferably a polyolefin resin. When the thermoplastic resin (a2) is a polyolefin resin or a polyphenylene ether resin, high compatibility with the styrene copolymer resin (a1) is obtained to easily provide high adhesion strength. Further, since the high-frequency dielectric heating adhesive, in which the thermoplastic resin (a2) is a polyolefin resin, is easily melted when the high-frequency electric field is applied, high adhesion strength is easily obtained.

Herein, the polyolefin resin includes a polar moiety-containing polyolefin resin and a polar moiety-free polyolefin resin. When the presence or absence of a polar moiety is specified, the polyolefin resin is described as a polar moiety-containing polyolefin resin or a polar moiety-free polyolefin resin.

The thermoplastic resin (a2) is also preferably a polar moiety-containing polyolefin resin. The thermoplastic resin (a2) may be a polar moiety-free polyolefin resin.
Polyolefin Resin Examples of the polyolefin resin as the thermoplastic resin (a2) include a resin including a homopolymer such as polyethylene, polypropylene, polybutene, or polymethylpentene; and an α-olefin resin including a copolymer of a monomer selected from the group consisting of ethylene, propylene, butene, hexene, octene, and 4-methylpentene. The polyolefin resin as the thermoplastic resin (a2) may be one resin alone or a combination of two or more resins.
Polar Moiety-Containing Polyolefin Resin The polar moiety in the polar moiety-containing polyolefin resin is not particularly limited as long as it is a moiety capable of imparting polarity to the polyolefin resin. The polar moiety-containing polyolefin resin is preferred because it exhibits a high adhesion force to an adherend. The high-frequency dielectric heating adhesive preferably contains the polar moiety-containing polyolefin resin as the thermoplastic resin (a2) because the dielectric property is easily improved to provide higher adhesion force to an adherend.

The polyolefin thermoplastic resin containing a polar moiety may be a copolymer of an olefin monomer and a polar moiety-containing monomer. Further the polyolefin thermoplastic resin containing a polar moiety may also be a resin obtained by introducing a polar moiety into a polyolefin resin by modification using an addition reaction, the polyolefin resin being prepared by polymerization of an olefin monomer.

The olefin monomer contained in the polar moiety-containing polyolefin resin is not limited to a particular type of monomer. Examples of the olefin monomer include ethylene, propylene, butene, hexene, octene, and 4-methyl-1-pentene. As the olefin monomer, one of these may be used alone, and a combination of two or more thereof may also be used.

Ethylene and propylene are preferred as the olefin monomer from the viewpoint of providing excellent mechanical strength and stable adhesion properties.

An olefin-derived structural unit in the polar moiety-containing polyolefin resin is preferably a structural unit derived from ethylene or propylene.

Examples of the polar moiety include a hydroxy group, a carboxy group, a vinyl acetate structure, and an acid anhydride structure. The polar moiety is also exemplified by an acid-modified structure introduced into the polyolefin resin by acid modification.

The acid-modified structure as a polar moiety is a moiety introduced by acid modification of a thermoplastic resin (for example, a polyolefin resin). Examples of a compound used for the acid modification of the polyolefin resin include unsaturated carboxylic acid derivative components each derived from any one of an unsaturated carboxylic acid, an acid anhydride of an unsaturated carboxylic acid, and an unsaturated carboxylic acid ester. Herein, a polyolefin resin having an acid-modified structure may be referred to as an acid-modified polyolefin resin.

Examples of the unsaturated carboxylic acid include acrylic acid, methacrylic acid, maleic acid, fumaric acid, itaconic acid, and citraconic acid.

Examples of the acid anhydride of the unsaturated carboxylic acid include maleic anhydride, itaconic anhydride, and citraconic anhydride.

Examples of the unsaturated carboxylic acid ester include methyl acrylate, ethyl acrylate, methyl methacrylate, ethyl methacrylate, butyl methacrylate, dimethyl maleate, monomethyl maleate, dimethyl fumarate, diethyl fumarate, dimethyl itaconate, diethyl itaconate, dimethyl citraconate, diethyl citraconate, and dimethyl tetrahydrophthalate anhydride.
Styrene Resin (a3)

The styrene resin (a3) as the thermoplastic resin (a2) may be a homopolymer of a styrene monomer (polystyrene: PS). Examples thereof include styrene homopolymer, α-methylstyrene homopolymer, and β-methylstyrene homopolymer.

PS may be a general-purpose polystyrene resin (GPPS resin) or a high impact polystyrene resin (HIPS resin). The high impact polystyrene resin (HIPS resin) is a resin containing a GPPS resin and a rubber-like elastic body.
Polyphenylene Ether Resin The polyphenylene ether resin as the thermoplastic resin (a2) may be, for example, a homopolymer resin of polyphenylene ether or a copolymer resin of polyphenylene ether. Or, the polyphenylene ether resin as the thermoplastic resin (a2) may be a modified polyphenylene ether resin that is a polymer alloy of the polyphenylene ether resin and a resin other than the polyphenylene ether resin.
Dielectric Filler (B)

The high-frequency dielectric heating adhesive according to the exemplary embodiment may contain a dielectric filler (B) or may not contain the dielectric filler (B) as long as a desired dielectric property is obtained.

The dielectric filler (B) is a filler that generates heat when a high-frequency electric field is applied. The high-frequency electric field is an electric field whose direction is reversed at a high frequency.

The dielectric filler (B) is preferably a filler that generates heat when a high-frequency electric field having a frequency range of 3 MHz or more and 300 MHz or less is applied. The dielectric filler (B) is preferably a filler that generates heat by the application of a high-frequency electric field having a frequency of, for example, 13.56 MHz, 27.12 MHz, or 40.68 MHz, in the frequency range of 3 MHz or more and 300 MHz or less.

The dielectric filler (B) is preferably an inorganic material, such as zinc oxide, silicon carbide (SiC), anatase titanium oxide, barium titanate, barium zirconate titanate, lead titanate, potassium niobate, rutile titanium oxide, an inorganic material having water of crystallization, such as hydrated aluminum silicate or hydrated aluminosilicate of an alkali metal, or an inorganic material having water of crystallization, such as hydrated aluminosilicate of an alkaline-earth metal, or a combination of two or more thereof.

The dielectric filler (B) preferably contains at least one selected from the group consisting of zinc oxide, silicon carbide, barium titanate, and titanium oxide, more preferably at least one selected from the group consisting of zinc oxide, barium titanate, and titanium oxide.

Among the exemplified dielectric fillers, the dielectric filler (B) is further preferably zinc oxide because it is available in a wide variety of types, selectable from various shapes and sizes, and can improve the adhesion properties and mechanical properties of the high-frequency dielectric heating adhesive according to the application. The use of zinc oxide as the dielectric filler (B) can produce a colorless high-frequency dielectric heating adhesive. Zinc oxide has a small density among dielectric fillers. This inhibits an increase in a total weight of a bonded body, in which an adherend is bonded using a high-frequency dielectric heating adhesive containing zinc oxide as the dielectric filler (B), compared to a case where an adhesive containing other dielectric fillers is used. Zinc oxide, which is not too high in hardness among ceramic materials, is not likely to damage an apparatus for producing a high-frequency dielectric heating adhesive. Zinc oxide, which is an inert oxide, causes less damage in a thermoplastic resin that may be mixed with zinc oxide.

Titanium oxide as the dielectric filler (B) is preferably at least one of anatase titanium oxide or rutile titanium oxide. In view of excellent dielectric property, anatase titanium oxide is more preferred.

The dielectric filler (B) content by volume of the high-frequency dielectric heating adhesive is preferably 5% or more by volume, more preferably 8% or more by volume, still more preferably 10% or more by volume.

The dielectric filler (B) content by volume of the high-frequency dielectric heating adhesive is preferably 50% or less by volume, more preferably 40% or less by volume, still more preferably 35% or less by volume, still further more preferably 25% or less by volume.

A dielectric filler (B) content by volume of 5% or more by volume of the high-frequency dielectric heating adhesive leads to an improvement in heat-generating properties, making it easier to firmly bond the high-frequency dielectric heating adhesive to an adherend.

A dielectric filler (B) content by volume of 50% or less by volume of the high-frequency dielectric heating adhesive can inhibit a decrease in the strength of the adhesive. Thus, the use of this adhesive can inhibit a decrease in bonding strength. Further, the high-frequency dielectric heating adhesive according to the exemplary embodiment may be an adhesive sheet. In this case, a dielectric filler (B) content by volume of 50% or less by volume of the adhesive sheet easily provides flexibility as a sheet and also inhibits deterioration of toughness. This facilitates processing of the high-frequency dielectric heating adhesive sheet into a desired shape in the subsequent process.

When the high-frequency dielectric heating adhesive according to the exemplary embodiment contains the thermoplastic resin (A) and the dielectric filler (B), the dielectric filler (B) content by volume is preferably 5% or more by volume, more preferably 8% or more by volume, still more preferably 10% or more by volume, with respect to a total volume of the thermoplastic resin (A) and the dielectric filler (B). The dielectric filler (B) content by volume is preferably 50% or less by volume, more preferably 40% or less by volume, still more preferably 35% or less by volume, still further more preferably 25% or less by volume, with respect to a total volume of the thermoplastic resin (A) and the dielectric filler (B).

The volume-average particle size of the dielectric filler (B) is preferably 1 μm or more, more preferably 2 μm or more, still more preferably 3 μm or more.

The volume-average particle size of the dielectric filler (B) is preferably 30 μm or less, more preferably 25 μm or less, still more preferably 20 μm or less.

A volume-average particle size of the dielectric filler (B) of 1 μm or more enables the high-frequency dielectric heating adhesive to exhibit high heat-generating performance when a high-frequency electric field is applied, and allows the bonding layer to bond firmly to the adherend in a short time.

A volume-average particle size of the dielectric filler (B) of 30 μm or less enables the high-frequency dielectric heating adhesive to exhibit high heat-generating performance when a high-frequency electric field is applied, and allows the bonding layer to adhere firmly to the adherend in a short time. The high-frequency dielectric heating adhesive according to the exemplary embodiment may be an adhesive sheet. In this case, a volume-average particle size of the dielectric filler (B) of 30 μm or less can inhibit a decrease in the strength of the high-frequency dielectric heating adhesive sheet.

The volume-average particle size of the dielectric filler (B) is measured by the following method. The particle size distribution of the dielectric filler (B) is measured by a laser diffraction/scattering method, and the volume-average particle size is calculated in accordance with JIS Z 8819-2:2001 from the results of the particle size distribution measurement.

Additive

The high-frequency dielectric heating adhesive according to the exemplary embodiment may contain an additive or may not contain an additive.

When the high-frequency dielectric heating adhesive according to the exemplary embodiment contains an additive, examples thereof include tackifiers, plasticizers, waxes, colorants, antioxidants, ultraviolet absorbers, antibacterial agents, coupling agents, viscosity modifiers, organic fillers, and inorganic fillers. The organic fillers and the inorganic fillers as additives are different from the dielectric fillers.

The tackifier and the plasticizer can improve the melting properties and the adhesion properties of the high-frequency dielectric heating adhesive.

Examples of the tackifiers include rosin derivatives, polyterpene resins, aromatic-modified terpene resins, hydrides of aromatic-modified terpene resins, terpene-phenolic resins, coumarone-indene resins, aliphatic petroleum resins, aromatic petroleum resins, and hydrides of aromatic petroleum resins.

Examples of the plasticizers include petroleum-based process oils, natural oils, dibasic acid dialkyl, and low-molecular-weight liquid polymers. Examples of the petroleum-based process oils include paraffin process oils, naphthene process oils, and aromatic process oils. Examples of the natural oils include castor oil and tall oil. Examples of the dibasic acid dialkyl include dibutyl phthalate, dioctyl phthalate, and dibutyl adipate. Examples of the low-molecular-weight liquid polymer include liquid polybutene and liquid polyisoprene.

When the high-frequency dielectric heating adhesive according to the exemplary embodiment contains an additive, the additive content of the high-frequency dielectric heating adhesive is preferably 0.01% or more by mass, more preferably 0.05% or more by mass, still more preferably 0.1% or more by mass, typically based on a total amount of the high-frequency dielectric heating adhesive. The additive content of the high-frequency dielectric heating adhesive is preferably 20% or less by mass, more preferably 15% or less by mass, still more preferably 10% or less by mass.

The high-frequency dielectric heating adhesive according to the exemplary embodiment preferably contains no solvent. The high-frequency dielectric heating adhesive containing no solvent is not likely to have a problem of volatile organic compounds (VOC) caused by the adhesive used for bonding with the adherend.

The high-frequency dielectric heating adhesive according to the exemplary embodiment is preferably free of carbon, a carbon compound mainly containing carbon (for example, carbon black), or a conductive material, such as a metal. The high-frequency dielectric heating adhesive according to the exemplary embodiment is preferably free of, for example, carbon steel, α-iron, γ-iron, δ-iron, copper, iron oxide, brass, aluminum, an iron-nickel alloy, an iron-nickel-chromium alloy, carbon fiber, or carbon black.

When the high-frequency dielectric heating adhesive according to the exemplary embodiment contains conductive materials, the conductive material contents of the adhesive are each independently preferably 7% or less by mass, more preferably 6% or less by mass, still more preferably 5% or less by mass, still further more preferably 1% or less by mass, yet still further more preferably 0.1% or less by mass, based on a total amount of the adhesive.

The conductive material content of the adhesive is particularly preferably 0% by mass.

A conductive material content of 7% or less by mass of the adhesive easily inhibits problems of electrical breakdown and carbonization of a bonded portion and an adherend during dielectric heating treatment.

The total amount of the thermoplastic resin (A) and the dielectric filler (B) contained in the high-frequency dielectric heating adhesive according to the exemplary embodiment is preferably 80% or more by mass, more preferably 90% or more by mass, still more preferably 93% or more by mass, still further more preferably 95% or more by mass, yet still further more preferably 99% or more by mass.

Properties of High-Frequency Dielectric Heating Adhesive

The properties of the high-frequency dielectric heating adhesive according to the exemplary embodiment are described below.

Tensile Modulus

The tensile modulus of the high-frequency dielectric heating adhesive according to the exemplary embodiment will be described. The high-frequency dielectric heating adhesive according to the exemplary embodiment has a tensile modulus of 20 MPa or more.

At a tensile modulus of the high-frequency dielectric heating adhesive of less than 20 MPa, when the high-frequency dielectric heating adhesive and an adherend are bonded together, the application of an impact to the resulting structure easily causes breakage of the high-frequency dielectric heating adhesive. Further, the handleability of the high-frequency dielectric heating adhesive when the high-frequency dielectric heating adhesive and the adherend are bonded together deteriorates, leading to low processability.

The upper limit of the tensile modulus of the high-frequency dielectric heating adhesive is not particularly limited, and may be, for example, 2,000 MPa or less. An excessively high tensile modulus of the high-frequency dielectric heating adhesive may, for example, result in lower processability when the high-frequency dielectric heating adhesive is cut into predetermined dimensions.

The tensile modulus of the high-frequency dielectric heating adhesive according to the exemplary embodiment is preferably 50 MPa or more, more preferably 100 MPa or more, still more preferably 200 MPa or more, still further more preferably 500 MPa or more, yet still further more preferably 750 MPa or more, even still further more preferably 1,000 MPa or more.

The tensile modulus of the high-frequency dielectric heating adhesive according to the exemplary embodiment is preferably 1,900 MPa or less, more preferably 1,800 MPa or less, still more preferably 1,500 MPa or less.

At a tensile modulus of the high-frequency dielectric heating adhesive of 50 MPa or more, when the high-frequency dielectric heating adhesive and an adherend are bonded together, even if an impact is applied to the resulting structure, the breakage of the high-frequency dielectric heating adhesive is more likely to be inhibited. Further, the handleability of the high-frequency dielectric heating adhesive when the high-frequency dielectric heating adhesive and the adherend are bonded together is higher, leading to higher processability.

A tensile modulus of the high-frequency dielectric heating adhesive of 1,900 MPa or less results in higher processability when a structure obtained by bonding the high-frequency dielectric heating adhesive and an adherend is cut into predetermined dimensions.

Tensile Rupture Elongation

In the high-frequency dielectric heating adhesive according to the exemplary embodiment, the tensile rupture elongation is preferably 5% or more, more preferably 10% or more, still more preferably 20% or more.

In the high-frequency dielectric heating adhesive according to the exemplary embodiment, the tensile rupture elongation is preferably 1,500% or less, more preferably 1,000% or less, still more preferably 750% or less, still further more preferably 500% or less, yet still further more preferably 200% or less, even still further more preferably 100% or less.

At a tensile rupture elongation of the high-frequency dielectric heating adhesive of 5% or more, when the high-frequency dielectric heating adhesive and an adherend are bonded together, even if an impact is applied to the resulting structure, the high-frequency dielectric heating adhesive is not easily broken. Further, the handleability of the high-frequency dielectric heating adhesive when the high-frequency dielectric heating adhesive and the adherend are bonded together is enhanced, leading to easy processing.

A tensile rupture elongation of 1,500% or less facilitates processing when the high-frequency dielectric heating adhesive is cut into predetermined dimensions.

Herein, the tensile modulus of the high-frequency dielectric heating adhesive can be measured in accordance with JIS K 7161-1:2014 and JIS K 7127:1999.

Herein, the tensile rupture elongation of the high-frequency dielectric heating adhesive can be measured in accordance with JIS K 7161-1:2014 and JIS K 7127:1999.

Dielectric Property

The dielectric property (tan δ/ε'r) of the high-frequency dielectric heating adhesive according to the exemplary embodiment will be described. In the high-frequency dielectric heating adhesive according to the exemplary embodiment, the dielectric property (tan δ/ε'r) of the high-frequency dielectric heating adhesive is 0.005 or more, where tan δ is a dielectric loss tangent at 23 degrees C. and a frequency of 40.68 MHz, and ε'r is a relative dielectric constant at 23 degrees C. and a frequency of 40.68 MHz.

At a dielectric property of the high-frequency dielectric heating adhesive of 0.005 or more, the high-frequency dielectric heating adhesive easily generates heat during dielectric heating treatment, making it possible to firmly bond the high-frequency dielectric heating adhesive and an adherend in a short time.

The dielectric property of the high-frequency dielectric heating adhesive according to the exemplary embodiment is more preferably 0.008 or more, still more preferably 0.010 or more.

When the dielectric property of the high-frequency dielectric heating adhesive according to the exemplary embodiment is 0.008 or more, the high-frequency dielectric heating adhesive more easily generates heat during dielectric heating treatment, making it possible to firmly bond the high-frequency dielectric heating adhesive and an adherend in a short time.

The upper limit of the dielectric property of the high-frequency dielectric heating adhesive according to the exemplary embodiment is not particularly limited. The dielectric property of the high-frequency dielectric heating adhesive according to the exemplary embodiment may be, for example, 0.1 or less, 0.08 or less, or 0.05 or less. The dielectric property of the high-frequency dielectric heating adhesive may satisfy, for example, 0.005 or more and 0.1 or less.

A dielectric property of the high-frequency dielectric heating adhesive of 0.1 or less easily inhibits overheating, which easily inhibits a damage to a portion where an adherend and the high-frequency dielectric heating adhesive come into contact with each other.

The dielectric property (tan $\delta/\varepsilon'r$) is a value obtained by dividing a dielectric loss tangent (tan $\delta$) measured with, for example, an impedance material instrument by a relative dielectric constant ($\varepsilon'r$) measured with, for example, an impedance material instrument.

The dielectric loss tangent (tan $\delta$) and the relative dielectric constant ($\varepsilon'r$) as the dielectric property of the high-frequency dielectric heating adhesive can be simply and accurately measured with an impedance material analyzer.

Details of a method for measuring the dielectric property of a high-frequency dielectric heating adhesive and an adherend are described below. A measurement sheet of the high-frequency dielectric heating adhesive is obtained. When a measurement sheet needs to be obtained from a structure, a measurement sheet having a uniform thickness is obtained by cutting out or shaving out from the structure. For example, in a case of an adhesive in the form of pellets, which are not formed into a sheet, a measurement sheet is obtained by forming the pellets into a sheet with, for example, a thermal press. The thickness of the measurement sheet is, for example 10 μm or more and 2 mm or less. The relative dielectric constant ($\varepsilon'r$) and the dielectric loss tangent (tan $\delta$) of the sheet obtained as described above are measured under the conditions of a frequency of 40.68 MHz at 23 degrees C. with an RF impedance material analyzer E4991A (available from Agilent Corp.), and a value of the dielectric property (tan $\delta/\varepsilon'r$) is calculated.

Flow Start Temperature

In the high-frequency dielectric heating adhesive according to the exemplary embodiment, the flow start temperature is preferably 80 degrees C. or higher, more preferably 100 degrees C. or higher, still more preferably 120 degrees C. or higher, still further more preferably 140 degrees C. or higher.

In the high-frequency dielectric heating adhesive according to the exemplary embodiment, the flow start temperature is preferably 250 degrees C. or lower, more preferably 220 degrees C. or lower, still more preferably 200 degrees C. or lower, still further more preferably 180 degrees C. or lower.

When the flow start temperature of the high-frequency dielectric heating adhesive is 80 degrees C. or higher, a structure produced with the high-frequency dielectric heating adhesive easily obtains heat resistance in everyday life.

When the flow start temperature of the high-frequency dielectric heating adhesive is 250 degrees C. or lower, the time for melting the high-frequency dielectric heating adhesive during bonding is easily inhibited from being long, and bonding strength between the high-frequency dielectric heating adhesive and an adherend is easily obtainable.

The flow start temperature can be measured by a method described in Examples described later.

Forms of High-Frequency Dielectric Heating Adhesive

The shape of the high-frequency dielectric heating adhesive according to the exemplary embodiment is not particularly limited, and is preferably in a sheet shape. That is, the high-frequency dielectric heating adhesive according to the exemplary embodiment is preferably an adhesive sheet (occasionally referred to as a high-frequency dielectric heating adhesive sheet). When the high-frequency dielectric heating adhesive is an adhesive sheet, the time required for the production process of a structure can be further shortened.

The high-frequency dielectric heating adhesive according to an exemplary form of the exemplary embodiment consists of a single bonding layer formed of the high-frequency dielectric heating adhesive sheet according to the exemplary embodiment. When the high-frequency dielectric heating adhesive is a high-frequency dielectric heating adhesive sheet formed of only a single bonding layer, the bonding layer itself corresponds to the high-frequency dielectric heating adhesive sheet; hence, the shape and properties of the high-frequency dielectric heating adhesive sheet correspond to the shape and properties of the bonding layer. The high-frequency dielectric heating adhesive sheet preferably consists of a single bonding layer. The high-frequency dielectric heating adhesive according to the exemplary embodiment is preferably a high-frequency dielectric heating adhesive sheet formed of only a single bonding layer. This can reduce the thickness of the high-frequency dielectric heating adhesive sheet and can also easily form the high-frequency dielectric heating adhesive sheet.

The high-frequency dielectric heating adhesion according to the exemplary embodiment is not limited to the exemplary form of the high-frequency dielectric heating adhesive sheet including only a single bonding layer. In another exemplary form of the high-frequency dielectric heating adhesion, the high-frequency dielectric heating adhesive sheet may include multiple layers. In this case, the high-frequency dielectric heating adhesive sheet may include a layer other than the bonding layer.

The high-frequency dielectric heating adhesive sheet may be formed of only a single bonding layer with high-frequency dielectric heating adhesiveness. Thus, herein, the terms "high-frequency dielectric heating adhesive sheet" and "bonding layer" are interchangeable with each other, in some cases.

Figure 1B:
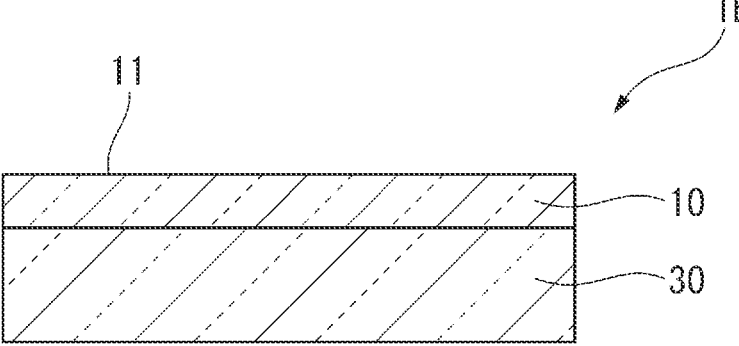
FIG. 1B is a schematic cross-sectional view of another exemplary high-frequency dielectric heating adhesive according to the exemplary embodiment.
Figure 1C:
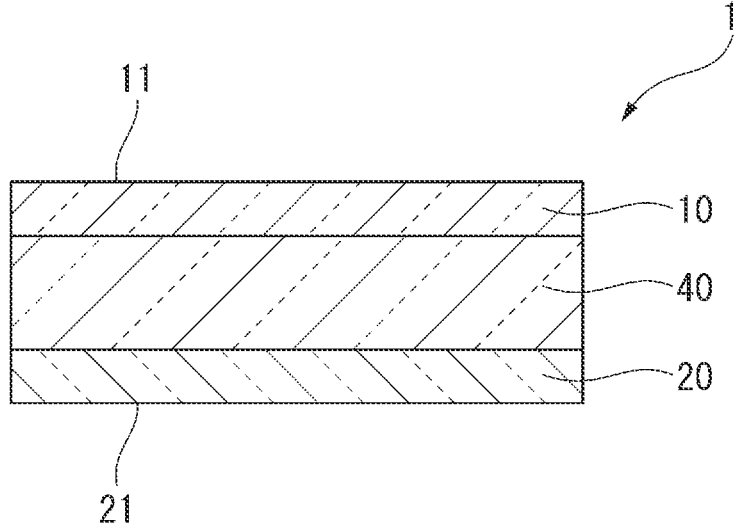
FIG. 1C is a schematic cross-sectional view of still another exemplary high-frequency dielectric heating adhesive according to the exemplary embodiment.

FIGS. 1A, 1B, and 1C schematically show exemplary forms of the high-frequency dielectric heating adhesive according to the exemplary embodiment.

A high-frequency dielectric heating adhesive 1A illustrated in FIG. 1A is an adhesive sheet formed of only a single bonding layer 10.

A high-frequency dielectric heating adhesive 1B illustrated in FIG. 1B is an adhesive sheet including a bonding layer 10 and a base 30 that supports the bonding layer 10. The bonding layer 10 has a first surface 11. The base 30 is not particularly limited as long as it is a member capable of supporting the bonding layer 10. Examples of the base 30 include resin sheets each containing at least one resin selected from the group consisting of polyolefin resins, polyester resins, acetate resins, ABS resins, polystyrene resins, and vinyl chloride resins. Examples of the polyolefin resins include polyethylene resins and polypropylene resins. Examples of the polyester resins include polybutylene terephthalate resins and polyethylene terephthalate resins. The base 30 may contain the dielectric filler (B). The dielectric filler (B) in the bonding layer 10 and the dielectric filler in the base 30 are mutually the same or different.

A high-frequency dielectric heating adhesive 1C illustrated in FIG. 1C is an adhesive sheet including an intermediate layer 40 disposed between the bonding layer 10 and a bonding layer 20. The high-frequency dielectric heating adhesive 1C has a first surface 11 and a second surface 21 on the opposite side from the first surface 11. In the high-frequency dielectric heating adhesive 1C, it is only required that the bonding layer 10 satisfies the conditions of the bonding layer of the high-frequency dielectric heating adhesive sheet according to the exemplary embodiment. In an exemplary form of the high-frequency dielectric heating adhesive 1C, both the bonding layer 10 and the bonding layer 20 are layers having the same composition and properties. In another exemplary form of the high-frequency dielectric heating adhesive 1C, the bonding layer 20 is a layer with high-frequency dielectric heating adhesiveness, the layer being different from the bonding layer 10 in at least one of composition or properties. In still another exemplary form of the high-frequency dielectric heating adhesive 1C, the bonding layer 20 is not a high-frequency dielectric heating adhesive layer but is a layer including a general-purpose adhesive. In this case, examples of the bonding layer 20 having no high-frequency dielectric heating adhesiveness include a dry solidification-type adhesive layer formed by evaporating water or a solvent and performing drying to a solid, or an adhesive layer formed from an adhesive (pressure-sensitive adhesive).

Thickness

When the high-frequency dielectric heating adhesive according to the exemplary embodiment is an adhesive sheet formed of only a single bonding layer, the thickness of the adhesive sheet according to the exemplary embodiment is preferably 5 μm or more, more preferably 10 μm or more, still more preferably 30 μm or more, particularly preferably 50 μm or more.

A thickness of the adhesive sheet of 5 μm or more improves heat-generating properties of the adhesive sheet in contact with an adherend during high-frequency application, thus facilitating firm bonding between the adhesive sheet and the adherend in a short time. Further, when the adhesive sheet is bonded to an adherend, the adhesive sheet easily follows irregularities of the adherend, easily providing adhesion strength.

When the adhesive sheet has a multilayer structure including multiple layers, the thickness of the bonding layer is preferably 5 μm or more, more preferably 10 μm or more, still more preferably 30 μm or more, still further more preferably 50 μm or more.

When the high-frequency dielectric heating adhesive sheet is a multilayered sheet, using the bonding layer having a thickness of 5 μm or more allows the bonding layer to easily follow the irregularities of an adherend when the adhesive sheet is bonded to the adherend, easily providing adhesion strength.

The upper limit of the thickness of the adhesive sheet is not particularly limited. A weight of the entire structure obtained by bonding the adhesive sheet and an adherend increases, as the thickness of the adhesive sheet is larger. Thus, the adhesive sheet preferably has a thickness in a range causing no problem in practical use in terms of, for example, processability and handleability. In consideration of the practicality and the formability of the high-frequency dielectric heating adhesive sheet, the thickness of the adhesive sheet according to the exemplary embodiment is preferably 2,000 μm or less, more preferably 1,000 μm or less, still more preferably 600 μm or less. The upper limit of the thickness of the adhesive sheet is preferably the above-described value regardless of whether the adhesive sheet is formed of only a single bonding layer or is a multilayered sheet provided by multiple layers including the bonding layer.

The adhesive sheet as the high-frequency dielectric heating adhesive has good handleability and workability during bonding with an adherend, compared with a case of using a liquid adhesive that needs to be applied.

Further, the thickness or the like of the adhesive sheet as the high-frequency dielectric heating adhesive can be appropriately controlled. Thus, the adhesive sheet can be applied to a roll-to-roll process, and the adhesive sheet can be processed by, for example, punching into any area and any shape in accordance with the adhesion area with an adherend and the shape of the adherend. Accordingly, the adhesive sheet as the high-frequency dielectric heating adhesive has significant advantages in terms of the production process.

The high-frequency dielectric heating adhesive according to the exemplary embodiment is preferably used by application of a high-frequency electric field in a frequency band from what is called short to ultrashort waves (for example, 3 MHz or higher and 300 MHz or lower). The application of a high-frequency electric field in the frequency band improves the heat generation properties during the application of a high frequency because the depth that can be heated is deep. Thus, even when the thickness of the high-frequency dielectric heating adhesive is large, it is easy to firmly bond the adhesive sheet to an adherend in a short time. The high-frequency dielectric heating adhesive according to the exemplary embodiment is preferably used for bonding to one or more adherends. The adherend will be described later.

As an index of fracture toughness of the high-frequency dielectric heating adhesive according to the exemplary embodiment, tear strength by a right-angled method is exemplified.

In the high-frequency dielectric heating adhesive according to the exemplary embodiment, the tear strength by the right-angled method is preferably 15 N/mm or more, more preferably 20 N/mm or more, still more preferably 25 N/mm or more, still further more preferably 30 N/mm or more, yet still further more preferably 40 N/mm or more, even still further more preferably 50 N/mm or more.

Assuming that the tear strength by the right-angled method of the high-frequency dielectric heating adhesive according to the exemplary embodiment is 15 N/mm or more. In this case, for example, even when a strong impact is applied to a structure obtained by bonding the high-frequency dielectric heating adhesive and an adherend, the breakage of the structure is easily inhibited.

The upper limit value of the tear strength by the right-angled method of the high-frequency dielectric heating adhesive according to the exemplary embodiment is not particularly limited, and may be, for example, 200 N/mm or less, or 100 N/mm or less.

Method for Producing High-Frequency Dielectric Heating Adhesive

The high-frequency dielectric heating adhesive according to the exemplary embodiment can be produced, for example, by mixing the foregoing components. When the high-frequency dielectric heating adhesive according to the exemplary embodiment is an adhesive sheet, for example, it can be produced by preliminarily mixing the foregoing components, kneading the resulting mixture using a known kneading device, such as an extruder or thermal rolls, and employing a known molding method, such as extrusion molding, calendar molding, injection molding, or casting molding.

Adherend

The material of an adherend is not particularly limited. The material of the adherend may be any of an organic material and an inorganic material (including, for example, a metal material), and may be a composite material of an organic material and an inorganic material.

The material of the adherend is preferably an organic material. Examples of the organic material as the material of the adherend include plastic materials and rubber materials. Examples of the plastic material include polypropylene resins, polyethylene resins, epoxy resins, polyurethane resins, acrylonitrile-butadiene-styrene copolymer resins (ABS resins), polycarbonate resins (PC resins), polyamide resins (such as nylon 6 and nylon 66), polyester resins (such as polyethylene terephthalate (PET resins) and polybutylene terephthalate resins (PBT resins)), polyacetal resins (POM resins), polymethyl methacrylate resins, and styrene resins (such as polystyrene resins). Examples of the rubber material include styrene-butadiene rubber (SBR), ethylene propylene rubber (EPR), and silicone rubber. The adherend may be a foamed material of an organic material.

Examples of the inorganic material as the material of the adherend include glass materials, cement materials, ceramic materials, and metal materials. The adherend may be formed from fiber reinforced plastics (FRP), which is a composite material of fibers and the above-described plastic material. The plastic material of the fiber reinforced plastics is at least one selected from the group consisting of, for example, polypropylene resins, polyethylene resins, polyurethane resins, acrylonitrile-butadiene-styrene copolymer resins (ABS resins), polycarbonate resins (PC resins), polyamide resins (such as nylon 6 and nylon 66), polyester resins (such as polyethylene terephthalate) (PET resins) and polybutylene terephthalate resins (PBT resins)), polyacetal resins (POM resins), polymethyl methacrylate resins, and polystyrene resins. Examples of the fibers in the fiber reinforced plastics include glass fibers, Kevlar fibers, and carbon fibers.

The adherend preferably has low conductivity.

When one or more adherends are bonded using the high-frequency dielectric heating adhesive according to the exemplary embodiment, the one or more adherends are formed from the same material or different materials. Preferably, the material of at least one adherend in the one or more adherends mainly contains a thermoplastic resin. Herein, the wording "mainly contains" means that a target substance is contained in the largest amount with respect to the whole. For example, it means that the target substance content is 50% or more by mass as a percentage of the whole.

In the one or more adherends, when the material of at least one adherend mainly contains a thermoplastic resin, the at least one adherend preferably contains a resin having an aromatic ring. The resin having an aromatic ring is a resin having an aromatic ring in its molecule. Examples thereof include aromatic polyester resins (such as polyethylene terephthalate (PET resins)), aromatic polycarbonate resins (aromatic PC resins), polyphenylene sulfide resins (PPS resins), polyphenylene ether resins (PPE resins), and styrene resins (such as, polystyrene resins). Of these, the resin having an aromatic ring is preferably a styrene resin. That is, the material of the adherend preferably contains a styrene resin, and more preferably contains the styrene resin as a main component. When the adherend contains a styrene resin, the adherend has excellent adhesiveness when bonded to the high-frequency dielectric heating adhesive according to the exemplary embodiment. When two or more adherends are bonded, the two or more adherends may each contain the same resin having an aromatic ring or may contain different resins each having an aromatic ring. The two or more adherends may each contain, for example, a styrene resin. When two or more adherends each contain a styrene resin, the two or more adherends may contain the same styrene resin or may contain different styrene resins. Examples of the styrene resin used as a material of the adherend include the same resins as described in the styrene copolymer resin (a1) and the thermoplastic resin (a2). Among the exemplified resins, a homopolymer of a styrene monomer (polystyrene: PS) is preferably contained. The adherend contains the resin having an aromatic ring in an amount of, in mass base, more preferably 50% or more by mass, still more preferably 60% or more by mass, still further more preferably 70% or more by mass, particularly preferably 80% or more by mass, with respect to the entire thermoplastic resin contained in the adherend. When the material of the adherend contains a styrene resin, an aromatic polyester resin, an aromatic polycarbonate resin, a polyphenylene sulfide resin, or a polyphenylene ether resin, the adherend contains the resin in an amount of, in mass base, preferably 50% or more by mass, more preferably 60% or more by mass, still more preferably 70% or more by mass, still further more preferably 80% or more by mass, with respect to the entire thermoplastic resin contained in the adherend.

The shape of the adherend is not particularly limited. When the high-frequency dielectric heating adhesive according to the exemplary embodiment is an adhesive sheet, the adherend preferably has a surface to which the adhesive sheet can be attached, and preferably has a sheet shape or a plate shape. When multiple adherends are bonded to each other, the shapes and dimensions of the adherends may be the same or different from each other.

Structure

A structure according to the exemplary embodiment includes the high-frequency dielectric heating adhesive according to the exemplary embodiment and one or more adherends. In the structure according to the exemplary embodiment, one or more adherends are bonded using the high-frequency dielectric heating adhesive according to the exemplary embodiment. The structure according to the exemplary embodiment is preferably a structure (such as a laminate) in which one or more adherends are laminated via the high-frequency dielectric heating adhesive. Further, the structure according to the exemplary embodiment may be a structure in which two or more adherends are laminated via the high-frequency dielectric heating adhesive. A case where the structure according to the exemplary embodiment includes two adherends will be described below with reference to the drawings.

Figure 2:
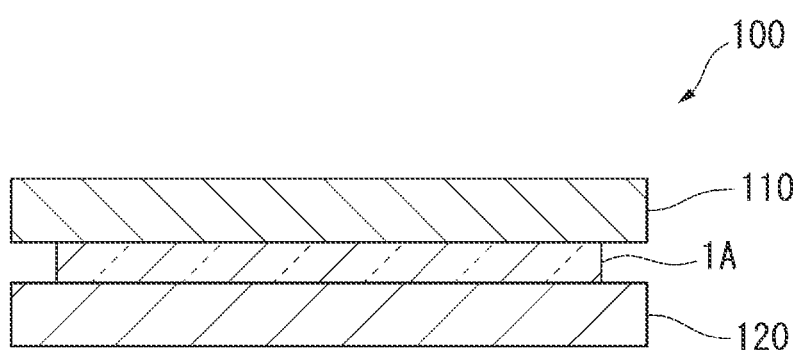
FIG. 2 is a schematic cross-sectional view of an exemplary structure according to the exemplary embodiment.

FIG. 2 is a schematic cross-sectional view of a structure 100 as an example of the exemplary embodiment.

The structure 100 includes a first adherend 110, a second adherend 120, and the high-frequency dielectric heating adhesive 1A. The high-frequency dielectric heating adhesive 1A is disposed between the first adherend 110 and the second adherend 120. The structure 100 is a laminate in which the first adherend 110, the high-frequency dielectric heating adhesive 1A, and the second adherend 120 are laminated in this order. The first adherend 110 and the second adherend 120 have the same dimensions in a thickness direction and a longitudinal direction. In the structure 100, the first adherend 110, the high-frequency dielectric heating adhesive 1A, and the second adherend 120 are arranged in such a manner that the center portions thereof in the longitudinal direction are aligned.

Figure 3:
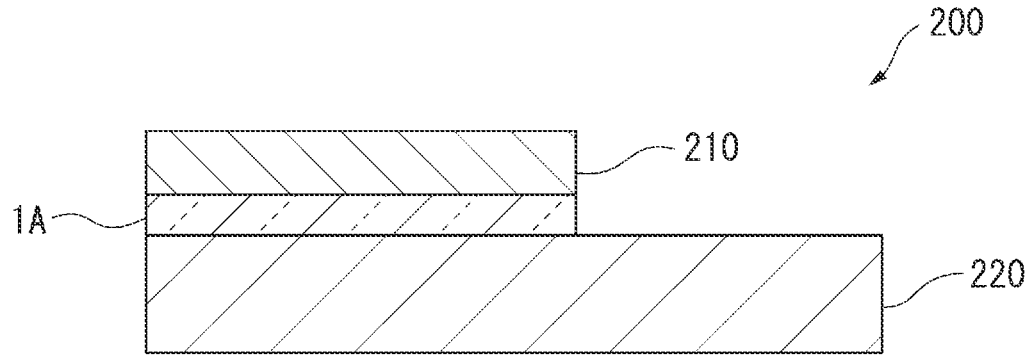
FIG. 3 is a schematic cross-sectional view of another exemplary structure according to the exemplary embodiment.

FIG. 3 is a schematic cross-sectional view of a structure 200 as another example of the exemplary embodiment.

The structure 200 includes a first adherend 210, a second adherend 220, and the high-frequency dielectric heating adhesive 1A. The high-frequency dielectric heating adhesive 1A is disposed between the first adherend 210 and the second adherend 220. The structure 200 is a laminate in which the first adherend 210, the high-frequency dielectric heating adhesive 1A, and the second adherend 220 are laminated in this order. The first adherend 210 and the high-frequency dielectric heating adhesive 1A have the same dimension in the longitudinal direction. The second adherend 220 is larger in dimensions in the thickness direction and the longitudinal direction than the first adherend 210. The first adherend 110 and the high-frequency dielectric heating adhesive 1A are arranged in such a manner that both end portions thereof in the longitudinal direction are aligned. The first adherend 110, the high-frequency dielectric heating adhesive 1A, and the second adherend 220 are arranged in such a manner that end portions thereof on one side in the longitudinal direction are aligned.

When the structure according to the exemplary embodiment is a laminate, the material of the adherend in the laminate is preferably an organic material. When the laminate includes two or more adherends, the adherends may be formed from the same material or different materials. In the two or more adherends in the laminate, preferably, the material of at least one adherend mainly contains a thermoplastic resin. As the thermoplastic resin as a material of the adherend, for example, a resin having an aromatic ring (such as a styrene resin) can be used. Examples of the resin having an aromatic ring as a material of the adherend include the exemplified resins described above. Examples of the styrene resin as a material of the adherend include the same resins as described in the styrene copolymer resin (a1) and the thermoplastic resin (a2). For example, in the case of the structure 100 illustrated in FIG. 2, the material of each of the first adherend 110 and the second adherend 120 serving as the outermost layers is preferably an organic material. When the material of each of the first adherend 110 and the second adherend 120 is an organic material, at least one of the first adherend 110 or the second adherend 120 preferably contains a resin having an aromatic ring (such as a styrene resin). The same applies to the case of the first adherend 210 and the second adherend 220 in the structure 200 of FIG. 3.

In the structure according to the exemplary embodiment, the position at which the high-frequency dielectric heating adhesive is disposed, the thickness, and the like are not limited to those illustrated in FIGS. 2 and 3.

In the structure according to the exemplary embodiment, the shape, size, number, and the like of the adherend are not limited to those illustrated in FIGS. 2 and 3.

The structure according to the exemplary embodiment is not limited to the structures in which two adherends are laminated via the high-frequency dielectric heating adhesive as illustrated in FIGS. 2 and 3.

Method for Producing Structure

A method for producing a structure according to the exemplary embodiment includes: disposing the high-frequency dielectric heating adhesive according to the exemplary embodiment on one or more adherends; and applying a high-frequency electric field to the high-frequency dielectric heating adhesive to bond the one or more adherends. The frequency of the high-frequency electric field applied is, for example, 3 MHz or more and 300 MHz or less. When a structure is produced by bonding two or more adherends and the high-frequency dielectric heating adhesive according to the exemplary embodiment, the method for producing the structure according to the exemplary embodiment includes: disposing the high-frequency dielectric heating adhesive according to the exemplary embodiment between the two or more adherends; and applying a high-frequency electric field to the high-frequency dielectric heating adhesive to bond the two or more adherends. Also in this case, the frequency of the high-frequency electric field applied is, for example, 3 MHz or more and 300 MHz or less.

In the method for producing the structure according to the exemplary embodiment, preferably, two or more adherends and the high-frequency dielectric heating adhesive are disposed between electrodes of a dielectric heater, and a high-frequency electric field is applied while pressing the two or more adherends and the high-frequency dielectric heating adhesive with the electrodes. The application of the high-frequency electric field while pressing with electrodes in this way facilitates the production of the structure in a shorter time.

According to the production method using the high-frequency dielectric heating adhesive according to the exemplary embodiment, only a predetermined portion can be locally heated from the outside with the dielectric heater. Thus, the production method using the high-frequency dielectric heating adhesive according to the exemplary embodiment is effective even when the adherend is a large and complex three-dimensional structure or a complex three-dimensional structure with a large thickness, and even when high dimensional accuracy is required.

As an example of the method for producing a structure according to the exemplary embodiment, an example in which two or more adherends are bonded using the high-frequency dielectric heating adhesive according to the exemplary embodiment will be described below. However, the invention is not limited thereto.

A bonding method according to an example of the exemplary embodiment includes step P1 and step P2 described below.

Step P1

Step P1 is a step of disposing the high-frequency dielectric heating adhesive according to the exemplary embodiment between two or more adherends. When a laminate is produced as the structure according to the exemplary embodiment, in step P1, for example, the adherend and the high-frequency dielectric heating adhesive are alternately disposed to laminate the two or more adherends via the high-frequency dielectric heating adhesive provided therebetween.

The high-frequency dielectric heating adhesive is preferably held between the adherends in such a manner that the adherends can be bonded to each other. The high-frequency dielectric heating adhesive may be held in a part between the adherends, in multiple portions between the adherends, or over an entire surface between the adherends. From the viewpoint of improving the adhesion strength between the adherends, the high-frequency dielectric heating adhesive is preferably held over the entire bonding surface between the adherends.

An example in which the high-frequency dielectric heating adhesive is held in a part between the adherends may be an example in which the high-frequency dielectric heating adhesive is arranged in a frame shape along an outer circumference of the bonding surface between the adherends and held between the adherends. The arrangement of the high-frequency dielectric heating adhesive in a frame shape can provide the bonding strength between the adherends and reduce the weight of the structure in comparison with a case where the high-frequency dielectric heating adhesive is arranged over the entire bonding surface.

According to the example in which the high-frequency dielectric heating adhesive is held in a part between the adherends, the amount of the high-frequency dielectric heating adhesive used and the size thereof can be reduced. Thus, the high-frequency dielectric heat treatment time can be shortened as compared with a case where the high-frequency dielectric heating adhesive is disposed over the entire bonding surface.

Step P2

Step P2 is a step of applying a high-frequency electric field to the high-frequency dielectric heating adhesive disposed between the adherends in step P1 to bond the two or more adherends. In an exemplary embodiment, the frequency of the high-frequency electric field applied is 3 MHz or more and 300 MHz or less. The high-frequency electric field can be applied to the high-frequency dielectric heating adhesive with, for example, a dielectric heater.

Dielectric Heater

Figure 4:
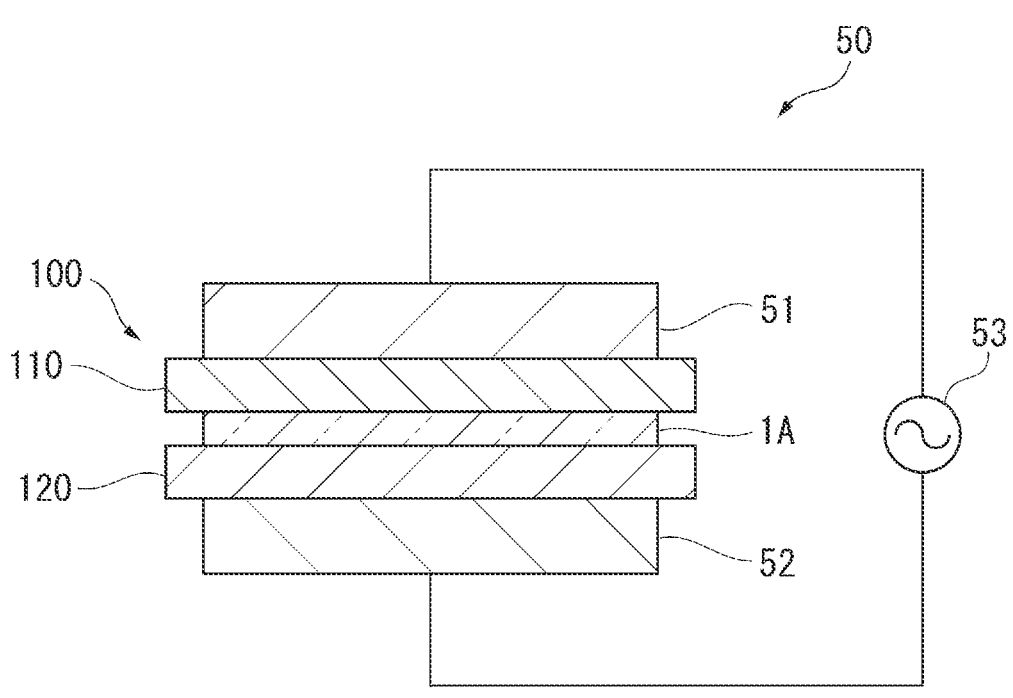
FIG. 4 schematically shows an example of high-frequency dielectric heating treatment using a high-frequency dielectric heating adhesive according to the exemplary embodiment and a dielectric heater.

FIG. 4 is a schematic diagram illustrating high-frequency dielectric heating treatment using the high-frequency dielectric heating adhesive according to the exemplary embodiment and a dielectric heater.

A dielectric heater 50 illustrated in FIG. 4 includes a first high-frequency electric field application electrode 51, a second high-frequency electric field application electrode 52, and a high-frequency power source 53.

The first high-frequency electric field application electrode 51 and the second high-frequency electric field application electrode 52 are arranged opposite each other. The first high-frequency electric field application electrode 51 and the second high-frequency electric field application electrode 52 have a pressing mechanism. A high-frequency electric field can also be applied while pressing two or more adherends and the high-frequency dielectric heating adhesive arranged between the electrodes with the pressing mechanism of the electrodes (the first high-frequency electric field application electrode 51 and the second high-frequency electric field application electrode 52) of the dielectric heater 50.

FIG. 4 illustrates an example of a method for producing the structure 100 (see FIG. 2) using the dielectric heater 50. The first adherend 110, the high-frequency dielectric heating adhesive 1A, and the second adherend 120 can be subjected to pressure treatment between the first high-frequency electric field application electrode 51 and the second high-frequency electric field application electrode 52 with the dielectric heater 50.

When the first high-frequency electric field application electrode 51 and the second high-frequency electric field application electrode 52 form a pair of flat-plate electrodes parallel to each other, this type of electrode arrangement may be referred to as a parallel plate type.

It is also preferable to use a high-frequency dielectric heater of a parallel plate type for the application of the high-frequency electric field. In a case of the high-frequency dielectric heater of the parallel plate type, the high-frequency electric field penetrates the high-frequency dielectric heating adhesive disposed between the electrodes; thus, it is possible to heat the entire high-frequency dielectric heating adhesive to bond the adherends and the high-frequency dielectric heating adhesive in a short time. In a case of producing a laminate as a structure, the high-frequency dielectric heater of the parallel plate type is preferably used.

The high-frequency power source 53 for applying a high-frequency electric field having a frequency of, for example, about 13.56 MHz, about 27.12 MHz, or about 40.68 MHz is connected to each of the first high-frequency electric field application electrode 51 and the second high-frequency electric field application electrode 52.

As illustrated in FIG. 4, the dielectric heater 50 performs dielectric heating treatment via the high-frequency dielectric heating adhesive 1A held between the first adherend 110 and the second adherend 120. In addition to the dielectric heat treatment, the dielectric heater 50 bonds the first adherend 110 and the second adherend 120 by pressing treatment using the first high-frequency electric field application electrode 51 and the second high-frequency electric field application electrode 52. Two or more adherends may be bonded by pressing only with own weight of the high-frequency dielectric heating adhesive and the adherends without the pressing treatment.

When a high-frequency electric field is applied between the first high-frequency electric field application electrode 51 and the second high-frequency electric field application electrode 52, the high-frequency dielectric heating adhesive 1A absorbs high-frequency energy. This can melt the thermoplastic resin component in the high-frequency dielectric heating adhesive 1A to firmly bond the first adherend 110 and the second adherend 120 even in a short treatment time.

When the high-frequency dielectric heating adhesive 1A contains a dielectric filler (not illustrated), the dielectric filler dispersed in the adhesive component absorbs high-frequency energy. The dielectric filler functions as a heat source. The thermoplastic resin component is melted by the heat generation of the dielectric filler, so that the first adherend 110 and the second adherend 120 can finally be firmly bonded even in a short treatment time.

The first high-frequency electric field application electrode 51 and the second high-frequency electric field application electrode 52 have the pressing mechanism and thus also function as a press. Accordingly, the first adherend 110 and the second adherend 120 can be more firmly bonded to each other by pressing in a compression direction with the first high-frequency electric field application electrode 51 and the second high-frequency electric field application electrode 52 and by heating and melting the high-frequency dielectric heating adhesive 1A. In the description of the method for producing a structure, the case of producing the structure 100 illustrated in FIG. 2 has been described as an example. However, the invention is not limited to this example.

High-Frequency Dielectric Heating Conditions

The high-frequency dielectric heating conditions can be changed as appropriate and is preferably set to the following conditions.

The output of the high-frequency electric field is preferably 10 W or more, more preferably 30 W or more, still more preferably 50 W or more, still further more preferably 80 W or more.

The output of the high-frequency electric field is preferably 50,000 W or less, more preferably 20,000 W or less, still more preferably 15,000 W or less, still further more preferably 10,000 W or less, yet still further more preferably 1,000 W or less.

When the output of the high-frequency electric field is 10 W or more, it is possible to inhibit a problem in which temperature has difficulty in increasing during dielectric heating treatment, thereby easily obtaining good bonding strength.

When the output of the high-frequency electric field is 50,000 W or less, it is easy to inhibit a problem in which temperature control is difficult during dielectric heating treatment.

The application time of the high-frequency electric field is preferably 1 second or more.

The application time of the high-frequency electric field is preferably 300 seconds or less, more preferably 240 seconds or less, still more preferably 180 seconds or less, still further more preferably 120 seconds or less, yet still further more preferably 90 seconds or less, particularly preferably 50 seconds or less.

When the application time of the high-frequency electric field is 1 second or more, it is possible to inhibit a problem in which temperature has difficulty in increasing during dielectric heating treatment, thereby easily obtaining a good adhesion force.

When the application time of the high-frequency electric field is 300 seconds or less, it is easy to inhibit problems such as a decrease in production efficiency of the structure, an increase in production cost, and thermal deterioration of the adherends.

The frequency of the high-frequency electric field applied is preferably 1 kHz or more, more preferably 1 MHz or more, still more preferably 3 MHz or more, still further more preferably 5 MHz or more, yet still further more preferably 10 MHz or more.

The frequency of the high-frequency electric field applied is preferably 300 MHz or less, more preferably 100 MHz or less, still more preferably 80 MHz or less, still further more preferably 50 MHz or less. Specifically, the industrial frequency band of 13.56 MHz, 27.12 MHz, or 40.68 MHz, which is allocated by the International Telecommunication Union, is also used in the production method and the bonding method using high-frequency dielectric heating of the exemplary embodiment.

Effects of the Exemplary Embodiment

The high-frequency dielectric heating adhesive of the exemplary embodiment contains the thermoplastic resin (A) containing the styrene copolymer resin (a1) and has a tensile modulus that satisfies a specific lower limit value; thus, the high-frequency dielectric heating adhesive has improved strength properties. When the adherend contains a styrene resin, the adhesive can be more firmly bonded to the adherend. The dielectric property of the high-frequency dielectric heating adhesive of the exemplary embodiment satisfies the lower limit value; thus, one or more adherends can be firmly bonded at once in a short time. According to the exemplary embodiment, it is possible to provide a structure in which one or more adherends are bonded using the high-frequency dielectric heating adhesive, and a method for producing the structure. According to the method for producing the structure, a structure in which one or more adherends are bonded can be produced in a short time.

The high-frequency dielectric heating adhesive according to the exemplary embodiment has excellent fracture toughness. Thus, the use of the high-frequency dielectric heating adhesive according to the exemplary embodiment inhibits a decrease in the strength of a structure in which the high-frequency dielectric heating adhesive and an adherend are bonded even when a strong impact is applied to the structure. As the structure, for example, assuming that an impact adhesion strength test is conducted on a structure having a shape similar to that of the structure 200 illustrated in FIG.

3, high impact adhesive strength is expected to be obtained. This is presumably because, for example, if a crack is present in the high-frequency dielectric heating adhesive, crack propagation starting from the crack in the structure does not easily occur.

The high-frequency dielectric heating adhesive has higher water resistance and moisture resistance than general-purpose adhesives.

The high-frequency dielectric heating adhesive according to the exemplary embodiment is locally heated by the application of a high-frequency electric field. Thus, the use of the high-frequency dielectric heating adhesive according to the exemplary embodiment easily inhibits a problem in which the entire adherend is damaged at the time of bonding with the adherend.

Modified Embodiments

The invention is not limited to the above-described embodiment. The invention can include modifications, improvements, and the like as long as they are compatible with the invention.

The high-frequency dielectric heating treatment may be performed by a high-frequency dielectric heater of a grid electrode type without limited to the dielectric heater with the electrodes arranged opposite each other as described in the above embodiment. The high-frequency dielectric heater of the grid electrode type includes a grid electrode in which electrodes of a first polarity and electrodes of a second polarity opposite to the first polarity are alternately arranged on the same surface at regular intervals. For simplification, an example in which a dielectric heater with the electrodes arranged opposite each other is used is illustrated in the drawing.

EXAMPLES

The invention will be described in more detail below with reference to Examples. The invention is not limited to the Examples.

Production of High-Frequency Dielectric Heating Adhesive (Examples 1 to 5 and Comparative Examples 1 to 4)

Materials for producing high-frequency dielectric heating adhesives (adhesive sheets) were preliminarily mixed to achieve compositions given in Table 1. In Table 1, a high-frequency dielectric heating adhesive sheet is expressed as an adhesive sheet.

The preliminarily mixed materials were fed to a hopper of a twin screw extruder having a 30-mm-diameter screw. Then, the cylinder set temperature and the die temperature were appropriately adjusted in accordance with the type of the thermoplastic resin (A), and the preliminarily mixed materials were melted and kneaded. The melt-kneaded materials were cooled and then cut to produce granular pellets. The produced granular pellets were charged into a hopper of a single-screw extruder equipped with a T-die. The cylinder temperature and the die temperature were appropriately adjusted in accordance with the type of the thermoplastic resin (A). A film-shaped melt-kneaded product was extruded from the T-die and cooled with a cooling roll to produce each of sheet-shaped high-frequency dielectric heating adhesives (high-frequency dielectric heating adhesive sheets) having a thickness of 400 μm according to Examples 1 to 5 and Comparative examples 1 to 4.

The thermoplastic resin (A) and the dielectric filler (B) given in Table 1 are described below. In Table 1, the styrene monomer unit content is expressed as an st monomer content.

Thermoplastic Resin (A)

Styrene Copolymer Resin (a1)

SEBS-1: styrene-ethylene/butylene-styrene copolymer (trade name "Tuftec H1043", styrene monomer unit content: 67% by mass, available from Asahi Kasei Corporation)

SEBS-2: styrene-ethylene/butylene-styrene copolymer (trade name "Tuftec H1053", styrene monomer unit content: 29% by mass, available from Asahi Kasei Corporation)

SEBS-3: styrene-ethylene/butylene-styrene copolymer (trade name "Espolex SB-2400", available from Sumitomo Chemical Company, Limited)

SBS: styrene-butadiene-styrene copolymer (trade name "Tufprene 126S", styrene monomer unit content: 40% by mass, available from Asahi Kasei Corporation)

SIS: styrene-isoprene-styrene copolymer (trade name "Quintac 3390", styrene monomer unit content: 48% by mass, available from Zeon Corporation)

SEBS-1, SEBS-2, and SEBS-3 are hydrogenated products of styrene copolymer resins. SBS and SIS are unhydrogenated products of styrene copolymer resins.

Thermoplastic Resin (a2)

GPPS: general-purpose polystyrene resin (trade name "HF77", styrene monomer unit content: 100% by mass, available from PS Japan Corporation)

Random PP: random polypropylene resin (trade name "Prime Polypro J705UG", styrene monomer unit content: 0% by mass, available from Prime Polymer Co., Ltd.)

Dielectric Filler (B)

ZnO: zinc oxide (product name "LP-ZINC11", available from Sakai Chemical Industry Co., Ltd.)

Volume-Average Particle Size of Dielectric Filler

The particle size distribution of the dielectric filler was measured by a laser diffraction/scattering method. From the results of the particle size distribution measurement, the volume-average particle size was calculated in accordance with JIS Z8819-2:2001. The calculated volume-average particle size of the zinc oxide (ZnO) was 11 μm.

Adherend

A sheet of a general-purpose polystyrene resin (product name "Dialite PS 201B-W1001", available from Kyoei Jushi Corporation)

Evaluation of High-Frequency Dielectric Heating Adhesive

The high-frequency dielectric heating adhesives (adhesive sheets) were evaluated as described below. Table 2 shows the evaluation results.

Tensile Modulus and Tensile Rupture Elongation

Each of the produced high-frequency dielectric heating adhesive sheets was cut into a test specimen having a length of 150 mm (TD direction) and a width of 15 mm (MD direction). The test specimen was held by chucks of a testing machine, and the tensile modulus (MPa) and the tensile rupture elongation (%) at 23 degrees C. were measured in accordance with JIS K 7161-1:2014 and JIS K 7127:1999. The tensile modulus (MPa) and the tensile rupture elongation (%) were measured with a tensile tester (Autograph AG-IS 500N, available from Shimadzu Corporation). The distance between the chucks was set to 100 mm. The tensile speed in the measurement of the tensile modulus (MPa) and the tensile rupture elongation (%) was set to 200 mm/min.

Dielectric Property

Each of the produced high-frequency dielectric heating adhesive sheets was cut into a size of 30 mm in length and 30 mm in width. A dielectric material test fixture 16453A (available from Agilent) was attached to an RF impedance material analyzer E4991A (available from Agilent), and the relative dielectric constant (ε'r) and the dielectric loss tangent (tan δ) of the cut high-frequency dielectric heating adhesive sheet were respectively measured under the conditions of a frequency of 40.68 MHz at 23 degrees C. by a parallel plate method. A value of the dielectric property (tan δ/ε'r) was calculated on the basis of the measurement results.

Flow Start Temperature

The flow start temperature of each of the produced high-frequency dielectric heating adhesive sheets was measured with a descending-type flow tester (Model "CFT-100D", available from Shimadzu Corporation). The load was set to 5.0 kg. A die having a hole shape with a diameter of 2.0 mm and a length of 5.0 mm and a cylinder having an inner diameter of 11.329 mm were used. The temperature of a measurement sample was measured in a measurement temperature range of 30 degrees C. to 300 degrees C. while the temperature of the measurement sample was increased at a rate of temperature increase of 10 degrees C./min. The stroke displacement rate (mm/min) that varied with the temperature increase was measured to provide a chart illustrating the dependence of the stroke displacement rate of the sample on temperature. The flow start temperature was read from this chart. In this chart, the temperature at which the stroke displacement rate started to increase again after passing a peak observed on the low-temperature side was defined as the flow start temperature.

Right-Angled Tear Test

A test specimen having a shape and dimensions specified in JIS K 7128-3:1998 was obtained by punching each of the produced high-frequency dielectric heating adhesive sheets. In accordance with the JIS standard, the tear strength of the high-frequency dielectric heating adhesive sheet by a right-angled method (tear strength by the right-angled method) was measured. The tear strength by the right-angled method was measured with a tensile tester (Autograph AG-IS 500N, available from Shimadzu Corporation). Gripping portions of the test specimen were attached to grips of the tester. The test specimen was pulled at a tensile speed of 200 mm/min. A maximum load F (N) was read. A tear strength T (N/mm) by the right-angled method was calculated by dividing the maximum load F by a thickness d (mm) of the test specimen (tear strength T by right-angled method)=maximum load F/thickness d of test specimen).

Weathering Test

Test specimens having the same shape and size as those for the right-angled tear test described above were separately prepared for a weathering test. The prepared test specimens were subjected to the weathering test with a super accelerated weathering tester (Eye Super UV Tester SUV-W161, available from Iwasaki Electric Co., Ltd). The test conditions were as follows: a metal halide lamp was used at an illuminance of 90 mW/cm$^2$, for an irradiation time of 48 hours, at a black panel temperature during irradiation of 63 degrees C., and at a relative humidity in the chamber of 70% RH. The above-described right-angled tear test was conducted with the test specimens after the irradiation.

In Examples 4 and 5, the test specimens deteriorated in the weathering test, making it impossible to perform the right-angled tear test after the weathering test. In Comparative examples 2, 3, and 4, the right-angled tear test after weathering test was not conducted because the adhesiveness evaluation described below was F.

Adhesiveness

Each of the produced high-frequency dielectric heating adhesives (adhesive sheets) was cut into dimensions of 25 mm in length and 12.5 mm in width. As adherends, two polystyrene resin sheets described above were provided, and each was cut into dimensions of 25 mm in length, 100 mm in width, and 2 mm in thickness. The adhesive sheet cut into the size described above was disposed between the two adherends and laminated.

The adherends and the adhesive sheet laminated as described above were fixed between two electrodes of a high-frequency dielectric heater (product name "YRP-400T-A", manufactured by Yamamoto Vinita Co., Ltd). In the fixed state, a high-frequency electric field was applied thereto under the following high-frequency application conditions to bond the high-frequency dielectric heating adhesive sheet and the adherends, thereby producing a test specimen for adhesiveness evaluation. Pressing pressure during the application of the high-frequency electric field is an initial set value of the pressure applied to the adhesive sheet.

Application Conditions of High-Frequency Electric Field
    Frequency: 40.68 MHz
    Output: 250 W
    Application time: 20 s
    Pressing pressure: 0.52 MPa The tensile shear force (unit: MPa) of the obtained test specimen was measured as the adhesion force. For the measurement of the tensile shear force, a universal tensile tester (Instron 5581, available from Instron Corp.) was used. The tensile speed in the measurement of the tensile shear force was set to a tensile speed of 100 mm/min. The measurement of the tensile shear force was in accordance with JIS K 6850:1999.

The adhesiveness of the produced test specimen for adhesiveness evaluation was evaluated in accordance with the following criteria.

A: The bonding strength was 1 MPa or more, or the adherend was broken.

F: The bonding strength was less than 1 MPa, or the adhesive sheet was peeled off at the interface between the adhesive sheet and an adherend.

The bonding strength of each test specimen for evaluation was 1 MPa or more.

TABLE 1

| | | | | | | | Dielectric |
| | | | Adhesive sheet | | | | |
| | | Thermoplastic resin (A) | | | | | filler (B) |
| | Styrene copolymer resin (a1) | | | Thermoplastic resin (a2) | | Styrenic | |
| | Type | st monomer content (% by mass) | Amount added (% by volume) | Type | st monomer content (% by mass) | Amount added (% by volume) | resin content of (A) (% by volume) | Amount added (% by volume) |
|---|---|---|---|---|---|---|---|---|
| Example 1 | SEBS-1 | 67 | 80 | — | — | — | 100 | 20 |
| Example 2 | SEBS-1 | 67 | 60 | PP | 0 | 20 | 75 | 20 |
| Example 3 | SEBS-2 | 29 | 80 | — | — | — | 100 | 20 |
| Example 4 | SBS | 40 | 80 | — | — | — | 100 | 20 |
| Example 5 | SIS | 48 | 80 | — | — | — | 100 | 20 |
| Comparative example 1 | — | — | — | GPPS | 100 | 80 | 100 | 20 |
| Comparative example 2 | SEBS-1 | 67 | 100 | — | — | — | 100 | — |
| Comparative example 3 | SEBS-1 | 67 | 10 | PP | 0 | 70 | 13 | 20 |
| Comparative example 4 | SEBS-3 | — | 100 | — | — | — | 100 | 20 |

TABLE 2

| | Evaluation of adhesive sheet | | | | | | |
| | Tensile properties | | | | Tear strength by right-angled method | | Evaluation of structure |
| | | | Tensile rupture | Dielectric property | Before weathering test | After weathering test | Bonding strength |
| | Flow start temperature (° C.) | Tensile modulus (MPa) | elongation (%) (%) | (tan δ/ ε'r) [—] | (N/mm) | (N/mm) | (MPa) | Evaluation |
|---|---|---|---|---|---|---|---|---|
| Example 1 | 168 | 1283 | 48 | 0.014 | 81 | 43 | 2.7 | A |
| Example 2 | 173 | 1340 | 52 | 0.013 | 85 | 46 | 1.9 | A |
| Example 3 | 144 | 66 | 822 | 0.013 | 34 | 20 | 2.2 | A |
| Example 4 | 122 | 240 | 840 | 0.013 | 42 | unmeasurerable | 3.7 | A |
| Example 5 | 146 | 361 | 481 | 0.013 | 56 | unmeasurerable | 2.6 | A |
| Comparative example 1 | 188 | 3020 | 2 | 0.013 | 3 | 2 | 3.0 | A |
| Comparative example 2 | 158 | 908 | 2 | 0 | 65 | — (unmeasured) | 0 | F |
| Comparative example 3 | 192 | 1471 | 59 | 0.013 | 96 | — (unmeasured) | 0.2 | F |
| Comparative example 4 | 130 | 11.7 | 813 | 0.013 | 23 | — (unmeasured) | 0.7 | F |

The results of the adhesiveness and the tear strength by the right-angled method of each Example were all superior to those of Comparative examples. These results indicate that the high-frequency dielectric heating adhesive according to the exemplary embodiment can be bonded in a short time and that the high-frequency dielectric heating adhesive having improved fracture toughness can be provided.

Explanation of Codes

The invention claimed is:

1. A high-frequency dielectric heating adhesive, comprising
a thermoplastic resin (A); and
a dielectric filler (B) that generates heat when a high-frequency electric field is applied, wherein
an amount of the dielectric filler (B) contained in the high-frequency dielectric heating adhesive is 5% or more by volume and 50% or less by volume,
the thermoplastic resin (A) comprises a styrene copolymer resin (a1),
an amount of the styrene copolymer resin (a1) contained in the thermoplastic resin (A) is 40% or more by volume and 100% or less by volume,
the styrene copolymer resin (a1) has a styrene monomer unit content of 10% or more by mass and 90% or less by mass,
a total amount of the thermoplastic resin (A) and the dielectric filler (B) contained in the high-frequency dielectric heating adhesive is 80% or more by mass,
the high-frequency dielectric heating adhesive has a tensile modulus of 20 MPa or more, and
the high-frequency dielectric heating adhesive has a dielectric property (tan $\delta/\varepsilon'$r) of 0.005 or more,
where tan $\delta$ is a dielectric loss tangent at 23 degrees C. and a frequency of 40.68 MHz, and
$\varepsilon'$r is a relative dielectric constant at 23 degrees C. and a frequency of 40.68 MHz.

2. The high-frequency dielectric heating adhesive according to claim 1, wherein
the dielectric filler (B) is at least one selected from the group consisting of zinc oxide, silicon carbide, titanium oxide, and barium titanate.

3. The high-frequency dielectric heating adhesive according to claim 1, wherein
the high-frequency dielectric heating adhesive has a flow start temperature of 80 degrees C. or higher and 250 degrees C. or lower.

4. The high-frequency dielectric heating adhesive according to claim 1, wherein
the styrene copolymer resin (a1) is a styrene elastomer.

5. The high-frequency dielectric heating adhesive according to claim 1, wherein
the styrene copolymer resin (a1) is a hydrogenated resin.

6. The high-frequency dielectric heating adhesive according to claim 1, wherein
the thermoplastic resin (A) further comprises a thermoplastic resin (a2) different from the styrene copolymer resin (a1).

7. The high-frequency dielectric heating adhesive according to claim 1, wherein
an amount of the styrene copolymer resin (a1) contained is 20% or more by volume and 98% or less by volume with respect to an entirety of the high-frequency dielectric heating adhesive.

8. The high-frequency dielectric heating adhesive according to claim 1, wherein
the high-frequency dielectric heating adhesive is used by applying a high-frequency electric field of 3 MHz or more and 300 MHz or less.

9. The high-frequency dielectric heating adhesive according to claim 1, wherein
the high-frequency dielectric heating adhesive is an adhesive for bonding one or more adherends, and
at least one of the one or more adherends comprises a resin having an aromatic ring.

10. The high-frequency dielectric heating adhesive according to claim 9, wherein
the resin having an aromatic ring is a styrene resin.

11. The high-frequency dielectric heating adhesive according to claim 1, wherein
the high-frequency dielectric heating adhesive is an adhesive sheet.

12. The high-frequency dielectric heating adhesive according to claim 11, wherein the adhesive sheet has a thickness of 5 μm or more and 2,000 μm or less.

13. A structure comprising one or more adherends bonded using the high-frequency dielectric heating adhesive according to claim 1.

14. A method for producing a structure, comprising:
disposing the high-frequency dielectric heating adhesive according to claim 1 on one or more adherends; and
applying a high-frequency electric field of 3 MHz or more and 300 MHz or less to the high-frequency dielectric heating adhesive to bond the adherends.

* * * * *